US 8,408,086 B2

(12) United States Patent
Takeuchi

(10) Patent No.: US 8,408,086 B2
(45) Date of Patent: Apr. 2, 2013

(54) AUTOMATED SHIFT CONTROL DEVICE AND STRADDLE-TYPE VEHICLE EQUIPPED WITH THE SAME

(75) Inventor: Yoshihiko Takeuchi, Shizuoka (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 1086 days.

(21) Appl. No.: 12/178,500

(22) Filed: Jul. 23, 2008

(65) Prior Publication Data

US 2009/0038425 A1 Feb. 12, 2009

(30) Foreign Application Priority Data

Jul. 24, 2007 (JP) ................................. 2007-191559

(51) Int. Cl.
*F16H 59/00* (2006.01)
*F16H 61/00* (2006.01)
*F16H 63/00* (2006.01)

(52) U.S. Cl. .......................................................... 74/335
(58) Field of Classification Search .................... 74/329, 74/335, 337.5; 123/197.1; 180/219, 230
See application file for complete search history.

(56) References Cited

U.S. PATENT DOCUMENTS

| | | | |
|---|---|---|---|
| 4,187,815 A * | 2/1980 | Kobayashi et al. | 123/548 |
| 4,846,010 A | 7/1989 | Fujikawa et al. | |
| 5,539,294 A * | 7/1996 | Kobayashi | 318/675 |
| 5,662,003 A * | 9/1997 | Ohara | 74/498 |
| 6,470,766 B2 * | 10/2002 | Ohta et al. | 74/425 |
| 7,575,083 B2 * | 8/2009 | Kosugi et al. | 180/219 |
| 7,595,456 B2 * | 9/2009 | Fukui et al. | 200/4 |
| 7,673,366 B2 * | 3/2010 | Yagi et al. | 15/250.3 |
| 7,823,472 B2 * | 11/2010 | Kosugi et al. | 74/335 |
| 8,001,864 B2 * | 8/2011 | Kosugi et al. | 74/335 |
| 2007/0261191 A1 * | 11/2007 | Yagi | 15/250.001 |

FOREIGN PATENT DOCUMENTS

| | | |
|---|---|---|
| EP | 1 329 651 A1 | 7/2003 |
| FR | 2 823 275 | 10/2002 |
| JP | 05039865 A | 2/1993 |
| WO | WO 01/50041 A2 | 7/2001 |

* cited by examiner

*Primary Examiner* — Troy Chambers
*Assistant Examiner* — Michael Gonzalez
(74) *Attorney, Agent, or Firm* — Rabin & Berdo, P.C.

(57) ABSTRACT

An automated shift control device suppresses overload of the shift motor and reduces the time from beginning to completion of a gear shifting operation. A transmission has a plurality of pairs of speed change gears and a gear selecting mechanism. A shift motor drives the gear selecting mechanism. A shift power transmission mechanism transmits power from the shift motor to the gear selecting mechanism. A torque limiter has a third reduction gear and a third shaft forming a part of the shift power transmission mechanism. The torque limiter transmits power from the shift motor as torque. When the transmitted torque is not more than a predetermined limit torque, the third reduction gear co-rotates with the third shaft. When the transmitted torque exceeds the predetermined limit torque, the third reduction gear rotates relative to the third shaft to limit the transmitted torque to the predetermined limit torque or less.

4 Claims, 13 Drawing Sheets

(a)

(b)

AUTOMATED SHIFT CONTROL DEVICE AND STRADDLE-TYPE VEHICLE EQUIPPED WITH THE SAME

RELATED APPLICATIONS

This application claims the benefit of priority under 35 USC 119 of Japanese patent application no. 2007-191559, filed on Jul. 24, 2007, which application is hereby incorporated by reference in its entirety.

BACKGROUND OF THE INVENTION

1. Field of the Invention

The present invention relates to an automated shift control device for a straddle-type vehicle.

2. Description of Related Art

Vehicles including an automated shift control device for automatically switching speed change gears are known. A typical automated shift control device includes a transmission having pairs of speed change gears with different transmission gear ratios and a gear selecting mechanism for selecting a pair to transmit power; a shift actuator for driving the gear selecting mechanism; and a shift power transmission mechanism for transmitting power from the shift actuator to the gear selecting mechanism.

In a transmission having dog gears, the gears sometimes may not engage or may not disengage smoothly during gear shifting. When this occurs in a foot-operated type transmission in which the gear selecting mechanism is driven via a shift pedal, for example, operation by foot may be repeated several times so that the gears engage or disengage to complete the gear shifting operation. However, in order to automatically perform such operation by means of an automated shift control device, an input from the shift actuator must be appropriately controlled in a complicated manner. On the other hand, when a situation in which the gears may not smoothly engage or disengage is left, there is a problem in that while the shift actuator is energized, rotation of the shift power transmission mechanism is restrained and therefore the shift actuator cannot rotate, thereby overloading the shift actuator.

Japanese Patent No. 3044498 proposes an automated shift control device in which a coil spring is disposed between the shift actuator and the shift drum of the gear selecting mechanism. According to Japanese Patent No. 3044498, when the shift actuator is energized but rotation of the shift power transmission mechanism is restricted, the coil spring elastically deforms, thus preventing overload of the shift actuator.

However, in order to prevent overload of the shift actuator by using elastic deformation of the coil spring, an elastic modulus of the coil spring must be set smaller. In other words, a compressive load when the coil spring elastically deforms ("compressive load of the coil spring") must be set small enough so that operation of the shift actuator is allowed when the shift power transmission mechanism stops.

However, as the compressive load of the coil spring becomes smaller, it becomes more difficult to disengage the dogs of the dog gears. Accordingly, another problem arises in that when the compressive load of the coil spring is set to be smaller, the engaged gears may not be smoothly disengaged, and the time from beginning to completion of the gear shifting operation may be increased.

On the other hand, when the compressive load of the coil spring is set to be larger, overload of the shift actuator cannot be suppressed as much as has been expected. Therefore, torque of the shift actuator must also be suppressed in order to prevent overload.

However, suppression of the torque of the shift actuator also reduces rotational speed of the shift actuator, and may increase the time from beginning to completion of the gear shifting operation.

SUMMARY OF THE INVENTION

In view of the foregoing circumstances, the present invention provides an automated shift control device that suppresses overload of a shift actuator and reduces the time from beginning to completion of a gear shifting operation.

An automated shift control device according to the present invention comprises a transmission having a plurality of pairs of speed change gears with different transmission gear ratios, and a gear selecting mechanism for selecting a pair of speed change gears to transmit power from among the plurality of pairs. A shift actuator generates power to drive the gear selecting mechanism. A shift power transmission mechanism transmits power from the shift actuator to the gear selecting mechanism. A torque limiter forms a part of the shift power transmission mechanism and has a first rotating member to which the power from the shift actuator is transmitted and a second rotating member to which the power transmitted to the first rotating member is transmitted as torque. When the torque to be transmitted to the second rotating member equals or is less than a predetermined limit torque, the first rotating member co-rotates with the second rotating member to transmit the power from the shift actuator to the second rotating member as the torque. When the torque to be transmitted to the second rotating member exceeds the predetermined limit torque, the first rotating member rotates relative to the second rotating member to limit the transmitted torque to the predetermined limit torque or less.

The predetermined limit torque is a torque that avoids overload of the shift actuator. The limit torque may be arbitrarily set as long as the shift actuator is not overloaded. Conversely, when the transmitted torque is limited by defining a torque of a certain value as a boundary in the state that the shift actuator is not overloaded, the torque at the boundary corresponds to the limit torque. In other words, the limit torque may be the maximum limit of the torque transmitted by the shift power transmission mechanism above which the shift actuator may be overloaded, or may be a value below the maximum limit. The limit torque is determined according to the type of the shift actuator. The torque limiter of the present invention can limit the transmitted torque to not more than the predetermined limit torque multiple times, rather than only once.

According to the present invention, a torque limiter forming a part of a shift power transmission mechanism and having a first rotating member and a second rotating member is provided. The first rotating member co-rotates with the second rotating member when the torque to be transmitted to the second rotating member equals or is less than the predetermined limit torque, and rotates relative to the second rotating member when the torque to be transmitted to the second rotating member exceeds the predetermined limit torque. Therefore, even when the transmitted torque within the shift power transmission mechanism exceeds the predetermined limit torque for some reason, the first rotating member rotates relative to the second rotating member to limit the torque transmitted to the gear selecting mechanism to the predetermined limit torque or less. As a result, overload of the shift actuator is suppressed.

Herein, "limiting the transmitted torque to the limit torque or less" means that the torque may be limited to not more than the predetermined limit torque that is not zero, or may be limited to zero.

Moreover, according to the present invention, while in order to limit overload of the shift actuator, the torque of the shift actuator itself is not suppressed and a torque limiter formed of an elastic member with a smaller elastic modulus is not used, it is possible to shorten the time from beginning to completion of the gear shifting operation. Therefore, overload of the shift actuator is prevented at the same time that the time of the gear shifting operation is reduced.

The present invention provides an automated shift control device that suppresses overload of the shift actuator while reducing the time from beginning to completion of the gear shifting operation; and a straddle-type vehicle equipped with the automated shift control device.

Other features and advantages of the invention will be apparent from the following detailed description, taken in conjunction with the accompanying drawings that illustrate, by way of example, various features of embodiments of the invention.

DETAILED DESCRIPTION OF THE INVENTION

Embodiments of the present invention are now described in detail with reference to the drawings.

Embodiments of a straddle-type vehicle according to the invention are now described. However, the invention is not limited to these embodiments. For example, while a motorcycle is described, the straddle-type vehicle according to the invention is not limited thereto and may be three-wheeled vehicles, buggy type vehicles, and the like.

<General Configuration of Motorcycle 1>

Figure 1:
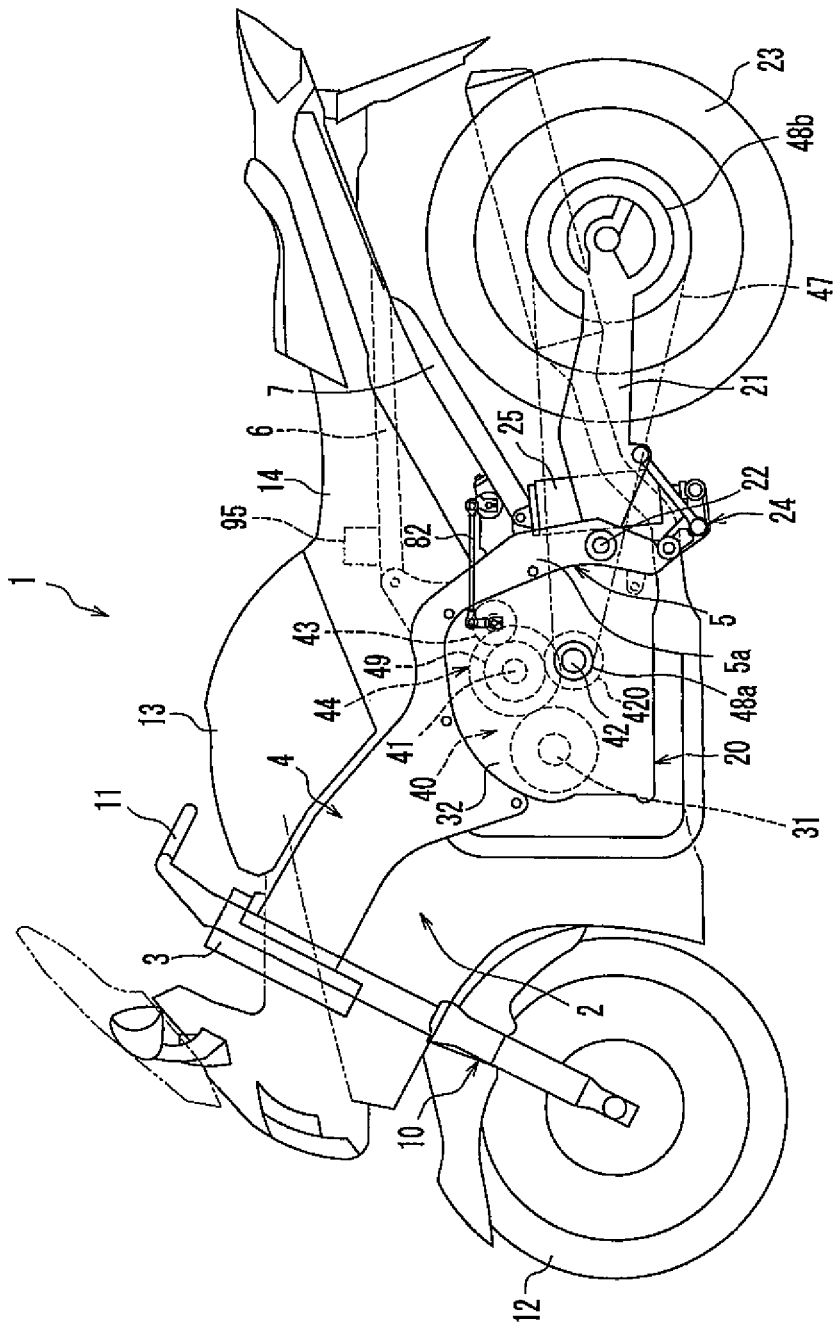
FIG. 1 is a side view of a motorcycle according to the present invention.
Figure 2:
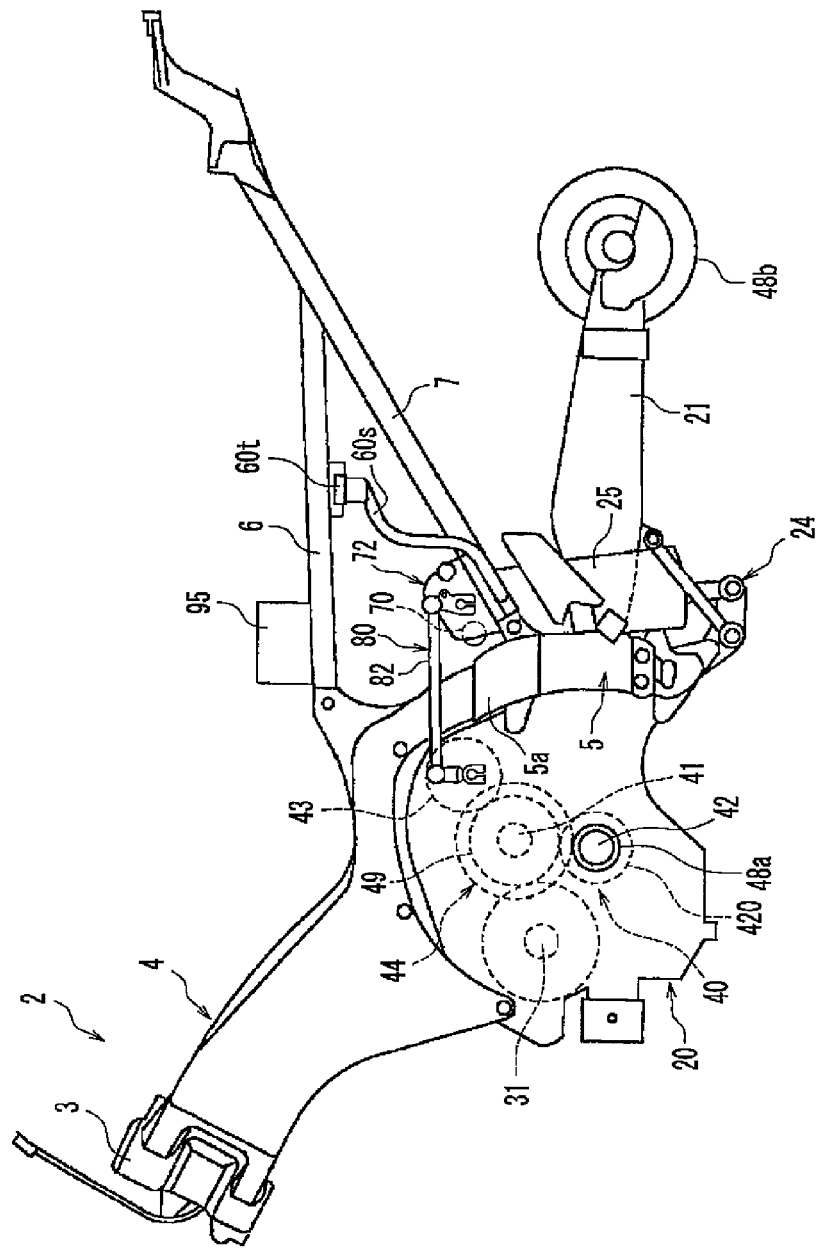
FIG. 2 is a side view showing an arrangement of an actuator of an automated shift control device according to the present invention.

As shown in FIGS. 1 and 2, a motorcycle 1 according to the present embodiment includes a head pipe 3 and a body frame 2. Body frame 2 includes a main frame 4 extending rearward from head pipe 3 and a rear-arm bracket 5 extending downwardly from the rear of main frame 4. A back stay 7 is attached to upper part 5*a* of rear-arm bracket 5. The rear part of a sheet rail 6 is connected to the rear part of back stay 7.

A front fork 10 is pivoted in head pipe 3. A steering handle 11 is disposed at the upper end of front fork 10, and a front wheel 12 is disposed at the lower end of front fork 10. A fuel tank 13 is disposed on main frame 4. A seat 14 disposed behind fuel tank 13 is placed on seat rail 6.

Rear-arm bracket 5 supports the front end of a rear arm 21 through a pivot shaft 22 so as to allow rear arm 21 to swing up and down. A rear wheel 23 is supported at the rear end of rear arm 21. Rear arm 21 is supported by body frame 2 through a link mechanism 24 and a rear shock absorber 25.

An engine 20 is suspended across main frame 4 and rear-arm brackets 5. While engine 20 is described as a water-cooled, four-cycle parallel four-cylinder engine, the type of engine 20 is not limited. Cylinder axes of engine 20 are oriented toward the front of motorcycle 1 and slightly oblique to a horizontal plane. A crankcase 32 containing a crankshaft 31 is suspended on both sides of body frame 2 in a width direction of motorcycle 1.

A main shaft 41 is provided in parallel to crankshaft 31. Crankshaft 31 is connected to main shaft 41 via a clutch mechanism 44 of a multiple-disc type. Details of clutch mechanism 44 are described later.

Multistage speed change gears 49 of different diameters are mounted on main shaft 41. A drive shaft 42 is disposed parallel to main shaft 41, and speed change gears 420 corresponding to speed change gears 49 are mounted on drive shaft 42. Each speed change gear 49 on main shaft 41 meshes with a corresponding speed change gear 420 mounted on drive shaft 42. Either or both of all speed change gears 49 and 420, except for one selected pair, freely or idly rotate relative to main shaft 41 or drive shaft 42. In this way, rotation is transmitted from main shaft 41 to drive shaft 42 through only the selected single pair of speed change gears.

Transmission 40 comprises main shaft 41, drive shaft 42, speed change gears 49 and 420, and a gear selecting mechanism 43 that selects one pair of speed change gears 49 and 420 to transmit power. Transmission 40 is integrally assembled into crankcase 32.

As show in FIG. 2, motorcycle 1 includes a shift motor 70 for generating power to drive gear selecting mechanism 43 of transmission 40 and a shift power transmission mechanism 80 for transmitting torque generated by shift motor 70 to gear selecting mechanism 43.

An automated manual transmission mechanism 50 (FIG. 10), also referred to as automated shift control device 50, automatically actuates clutch mechanism 44 and switches the speed change gears of transmission 40. Details of automated shift control device 50 are described later.

As shown in FIG. 1, a drive sprocket 48*a* is provided on drive shaft 42. A driven sprocket 48*b* is provided on rear wheel 23. A chain 47 extends between drive sprocket 48*a* and driven sprocket 48*b*. Thus, the power of engine 20 transmitted to drive shaft 42 through transmission 40 is transmitted to rear wheel 23 through chain 47.

The general configuration of motorcycle 1 has been described. Clutch mechanism 44 is now described in detail with reference to FIG. 3.

<Configuration of Clutch Mechanism 44>

Clutch mechanism 44 is a multiple-disc friction clutch, and includes a clutch housing 443 of a cylindrical shape, a clutch boss 447 of a cylindrical shape, a plurality of friction discs 445 and clutch plates 449 serving as friction discs, and a pressure plate 451. Clutch mechanism 44 also includes a gear 441 that meshes with a gear 310 formed on crankshaft 31. An engine rotational speed sensor S30 is mounted at one end of crankshaft 31. Main shaft 41 is provided with a main shaft rotational sensor S31.

Clutch housing 443 has a cylindrical shape and is mounted on main shaft 41 so as to allow relative rotation. An engaging portion 443B having an engaging hole 443A is provided at one end of clutch housing 443 (on the left in FIG. 3). An engaging projection 441A of gear 441 fits into engaging hole 443A so that gear 441 and clutch housing 443 are engaged with each other to prevent relative rotation. The inner surface of the cylindrical portion of clutch housing 443 is formed with a plurality of grooves extending in an axial direction of main shaft 41.

Each friction disc 445 is formed as a ring-shaped thin plate with a plurality of teeth formed on an outer rim thereof. Friction discs 445 are attached to clutch housing 443 so that the teeth formed engage with grooves formed on an inner surface of clutch housing 443, disabling relative rotation. Friction discs 445 are slidably attached to clutch housing 443 in the axial direction of main shaft 41 such that faces of friction discs 445 are approximately perpendicular to the axial direction of main shaft 41.

Clutch boss 447 has a cylindrical shape and is disposed inward in a radial direction of clutch housing 443 in respect to main shaft 41, and attached to main shaft 41 so as not to allow relative rotation. A disc-like flange portion 447A having an outer diameter that is approximately equal to that of clutch plates 449 is provided at one end of clutch boss 447 (on the left in FIG. 3). Clutch boss 447 is fixed to main shaft 41 such that flange portion 447A is located on the side of engaging portion 443B of clutch housing 443. A pressing member 447B is formed, on the side of clutch plates 449 of flange portion 447A, to sandwich friction discs 445 and clutch plates 449 in the axial direction of main shaft 41 together with pressure plate 451. The outer surface of the cylindrical portion of clutch boss 447 is formed with a plurality of grooves 447C extending in the axial direction of main shaft 41.

Each clutch plate 449 is formed as a ring-shaped thin plate with a plurality of teeth on an inner rim thereof. Clutch plates 449 are attached to clutch boss 447 such that their teeth engage with grooves 447C on the outer surface of clutch boss 447, thereby disabling relative rotation. Clutch plates 449 are slidably attached to clutch boss 447 in the axial direction of main shaft 41 such that faces of clutch plates 449 are approximately perpendicular to the axial direction of main shaft 41.

Friction discs 445 and clutch plates 449 are arranged alternately in the axial direction of main shaft 41.

Pressure plate 451 slides relative to clutch boss 447 in the axial direction of main shaft 41, but does not rotate relative to clutch boss 477. Pressure plate 451 is driven by a clutch motor 60. Pressure plate 451 is formed with a plate-like pressing member 451B to sandwich friction discs 445 and clutch plates 449 in the axial direction of main shaft 41 together with pressing member 447B of flange portion 447A.

A plurality of springs 450 provided in clutch mechanism 44 surround cylindrical grooves 447C. Springs 450 bias pressure plate 451 to the left in FIG. 3. In other words, springs 450 bias pressure plate 451 in a direction in which pressing member 451B of pressure plate 451 comes close to pressing member 447B of clutch boss 447.

The center of pressure plate 451 is engaged with one end of a push rod 455 (on the right in FIG. 3), for example, through a bearing such as a deep-groove ball bearing 457, so that the pressure plate freely rotates relative to push rod 455. The other end of push rod 455 (on the left in FIG. 3) is engaged with an inside of the end of cylindrical main shaft 41. Inside cylindrical main shaft 41, a spherical ball 459 is provided next to the other (left) end of push rod 455, and a push rod 461 is provided next to ball 459, at a left side of ball 459.

One (left) end 461A of push rod 461 projects from the other (left) end of cylindrical main shaft 41. Projecting end 461A of push rod 461 is integrated with a piston 463 that is connected to clutch motor 60. Piston 463 is guided by a cylinder body 465 to freely slide in the axial direction of main shaft 41.

The configuration of clutch mechanism 44 has been described. Gear selecting mechanism 43 and shift power transmission mechanism 80 are now described in detail.

<Gear Selecting Mechanism 43>

Figure 3:
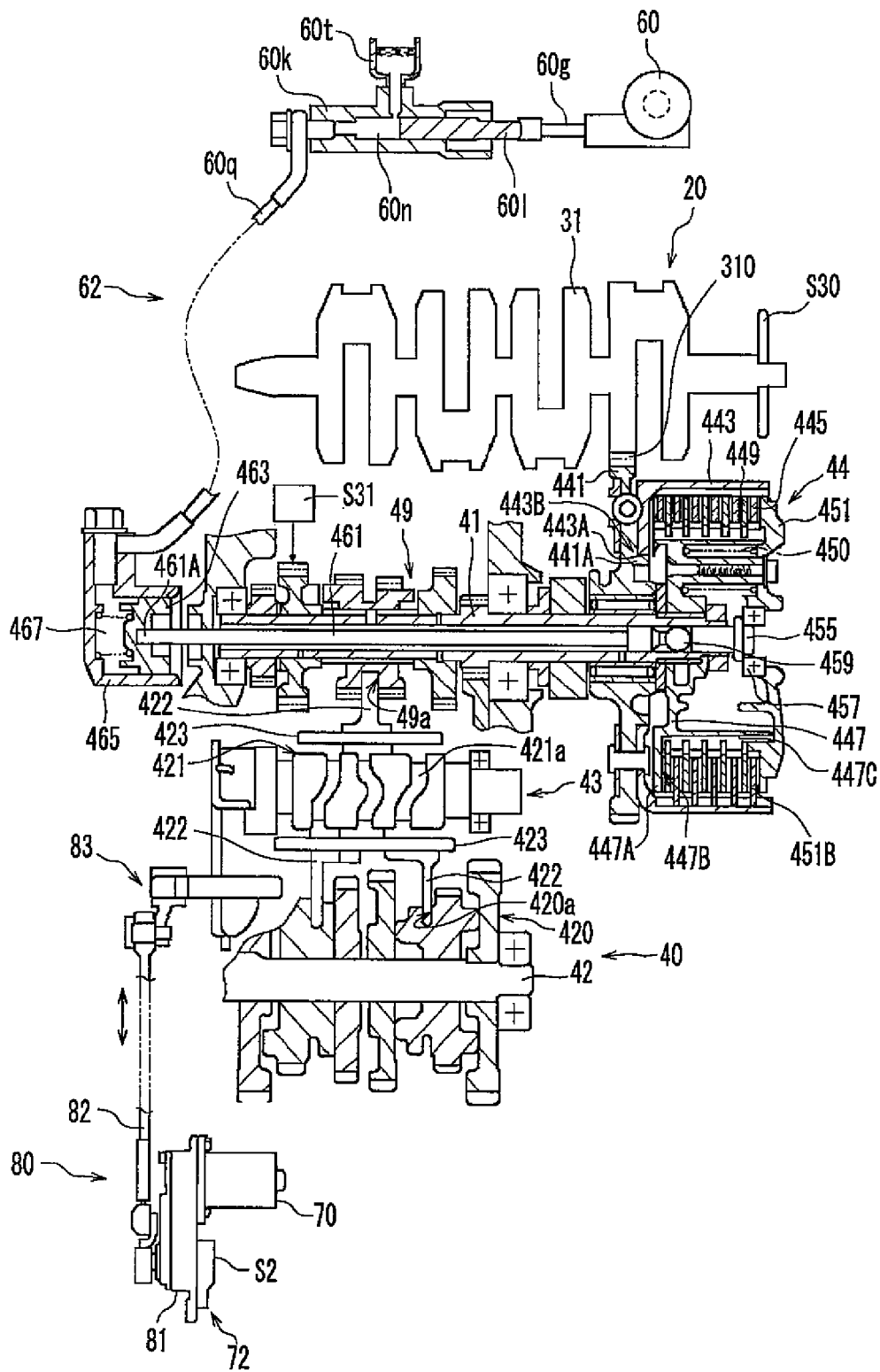
FIG. 3 is a cross-sectional view of an engine according to the present invention.

As shown in FIG. 3, gear selecting mechanism 43 includes a shift cam 421 serving as a shift input shaft, as well as shift forks 422. A plurality of cam grooves 421a are formed on the outer surface of shift cam 421. Shift fork 422 is branched from a root into two tips. The root of shift fork 422 is slidably attached to a shift fork shaft 423 in the axial direction of the shaft. One tip of shift fork 422 engages with cam groove 421a of shift cam 421. The other tip of shift fork 422 engages with annular grooves 49a and 420a provided on speed change gears 49 and 420.

With such a configuration, when shift cam 421 is driven to rotate, shift forks 422 move axially along cam groove 421a, to axially move speed change gears 49 and 420. In this way, only a pair of the speed change gear 49 and the speed change gear 420 is selected, respectively fixed to main shaft 41 and drive shaft 42 by splines. The position of the speed change gears is thus determined, and transmission of rotation between main shaft 41 and drive shaft 42 is executed at a specified speed change ratio via speed change gear 49 and speed change gear 420.

<Shift Power Transmission Mechanism 80>

Figure 4:
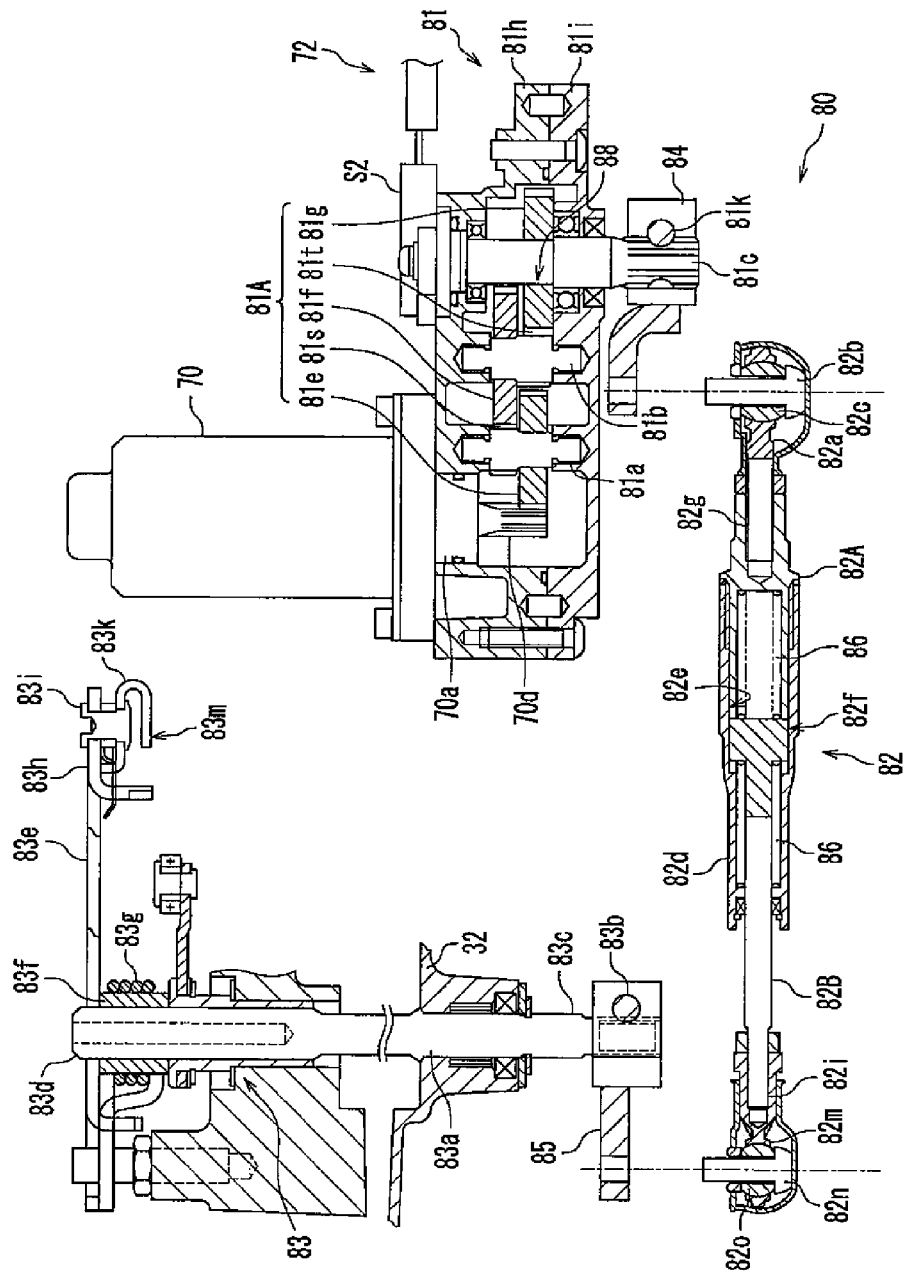
FIG. 4 is an exploded cross-sectional view of a shift motor and a shift power transmission mechanism according to the present invention.
Figure 5:
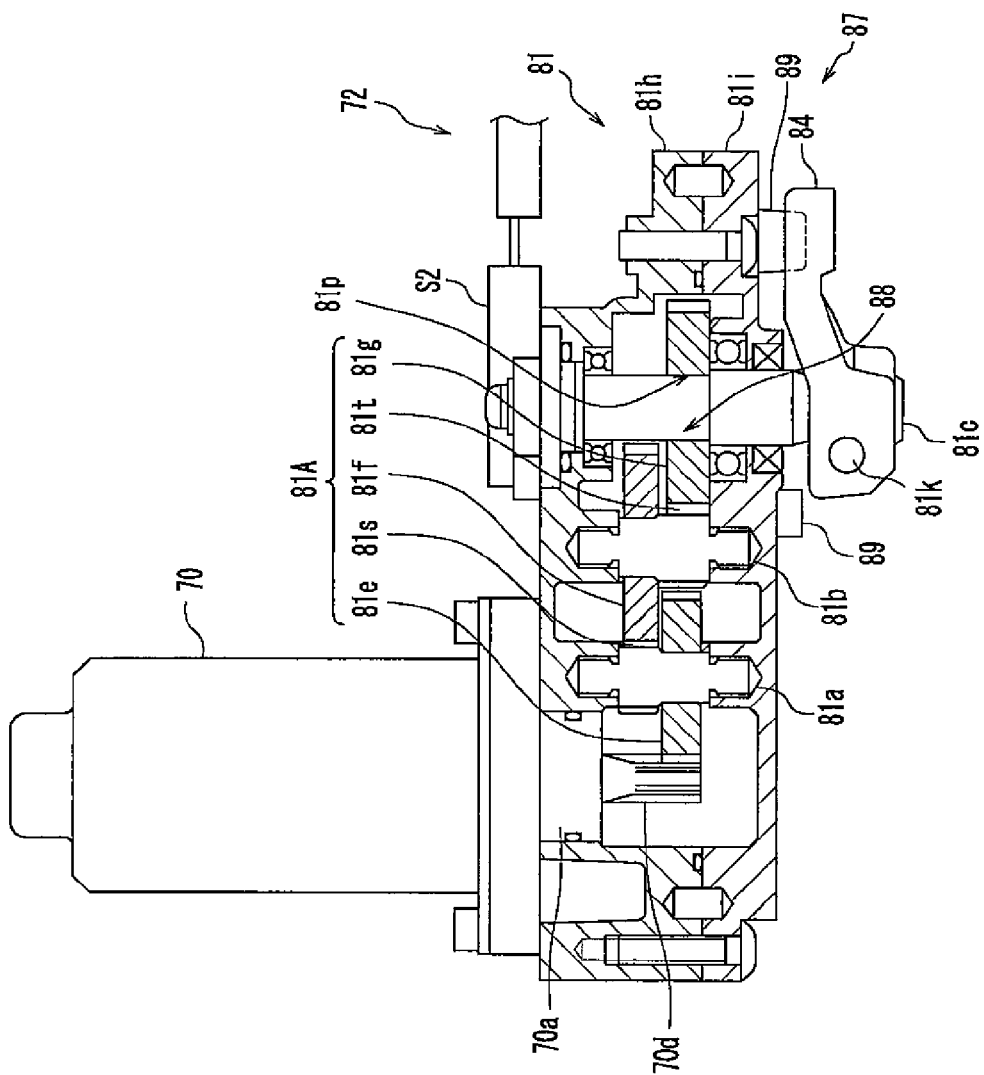
FIG. 5 is an enlarged view of a shift actuator unit and an actuating lever of the mechanism of FIG. 4.

As shown in FIG. 4, shift power transmission mechanism 80 includes a reduction mechanism 81 for reducing the speed of shift motor 70, a shift rod 82 and a shift link mechanism 83. While in the present embodiment, shift motor 70 of an electric type is used as a shift actuator, a hydraulic actuator may instead be used as the shift actuator. As shown in FIG. 5, shift motor 70, as well as a shift position detecting device S2 and reduction mechanism 81, is integrated as shift actuator unit 72. Integration of shift motor 70 and reduction mechanism 81 as shift actuator unit 72 facilitates assembling, maintenance and the like.

As shown in FIG. 5, reduction mechanism 81 includes four shafts 70a, 81a, 81b and 81c and three reduction gears 81e, 81f and 81g. Reduction mechanism 81 is housed within gear cases 81h and 81i.

The first of the four shafts is formed of motor shaft 70a of shift motor 70. The second to fourth shafts are respectively formed of a first shaft 81a, a second shaft 81b and a third shaft 81c. The first shaft, i.e., motor shaft 70a forms an input shaft of reduction mechanism 81. A gear 70d is formed at one end of motor shaft 70a. The fourth shaft, i.e., third shaft 81c forms a drive (output) shaft of reduction mechanism 81.

A first reduction gear 81e is press-fitted to first shaft 81a and is disposed to engage with gear 70d of motor shaft 70a. First shaft 81a has a gear 81s formed thereon. A second reduction gear 81f is press-fitted to second shaft 81b and is disposed to engage with gear 81s of first shaft 81a. Second shaft 81b has a gear 81t formed thereon. A third reduction gear 81g is press-fitted to third shaft 81c and is disposed to engage with gear 81t of second shaft 81b.

In this way, first reduction gear 81e, gear 81s, second reduction gear 81f, gear 81t and third reduction gear 81g form a reduction gear train 81A which reduces rotation of shift motor 70. First reduction gear 81e at the most upstream side of reduction gear train 81A engages with gear 70d. With this arrangement, the torque of shift motor 70 is transmitted to reduction gear train 81A via gear 70d and increased.

Third reduction gear 81g and third shaft 81c form a torque limiter 88. Torque limiter 88 limits overload of shift motor 70 by restricting rotation of shift power transmission mechanism 80, for example, when speed change gears 49 and 420 do not smoothly engage or disengage.

Figure 6:
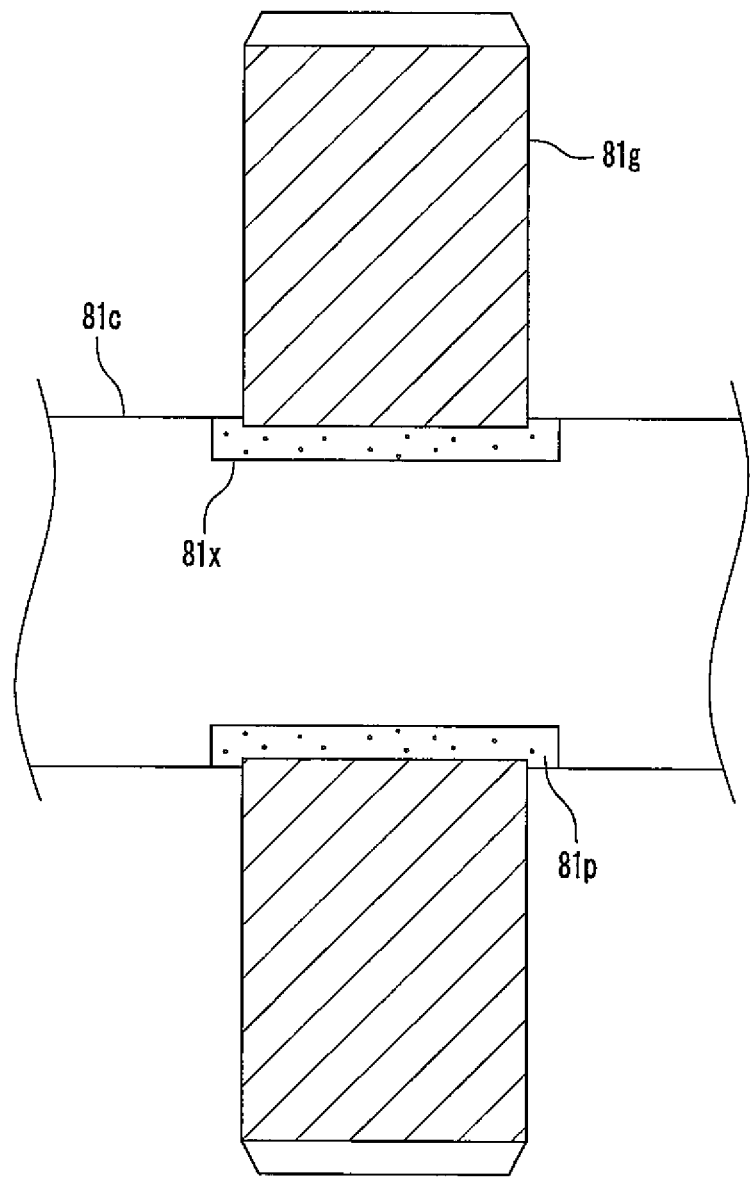
FIG. 6 is an enlarged cross-sectional view showing a press-fitted portion of a third shaft of FIG. 5.

Specifically, as shown in FIG. 6, a surface of a press-fitted portion 81p of third shaft 81c to which third reduction gear 81g is press-fitted is corbett-treated (i.e., sulphurized at a low temperature) to form a sulphurized layer 81x having self-lubrication properties on the surface of a press-fitted portion 81p. Then, third reduction gear 81g is press-fitted to third shaft 81c so as to co-rotate with third shaft 81c when the torque to be transmitted by shift power transmission mechanism 80 is not more than a predetermined limit torque L, and so as to slip (i.e., relatively rotate) relative to third shaft 81c when the torque to be transmitted by shift power transmission mechanism 80 exceeds predetermined limit torque L. Specifically, when the torque to be transmitted by shift power transmission mechanism 80 is not more than predetermined limit torque L, third reduction gear 81g co-rotates with third shaft 81c due to the frictional force between third reduction gear 81g and third shaft 81c. In other words, third reduction gear 81g and third shaft 81c rotate at the same rotational speed. On the other hand, when the torque to be transmitted by shift power transmission mechanism 80 exceeds predetermined limit torque L, against the frictional force generated between third reduction gear 81g and third shaft 81c, third reduction gear 81g slips relative to third shaft 81c. In other words, third reduction gear 81g and third shaft 81c relatively rotate.

First reduction gear 81e and second reduction gear 81f have a press-fitted interference (i.e., diameter of the shaft/diameter of the press-fitted gear) greater than that of third reduction gear 81g. With the greater interference, holding torque increases, and the torque when relative rotation stars also increases. Accordingly, even when the torque to be transmitted by shift power transmission mechanism 80 exceeds predetermined limit torque L, first reduction gear 81e and second reduction gear 81f do not rotate relative to, respectively, first shaft 81a and second shaft 81b.

Figure 7:
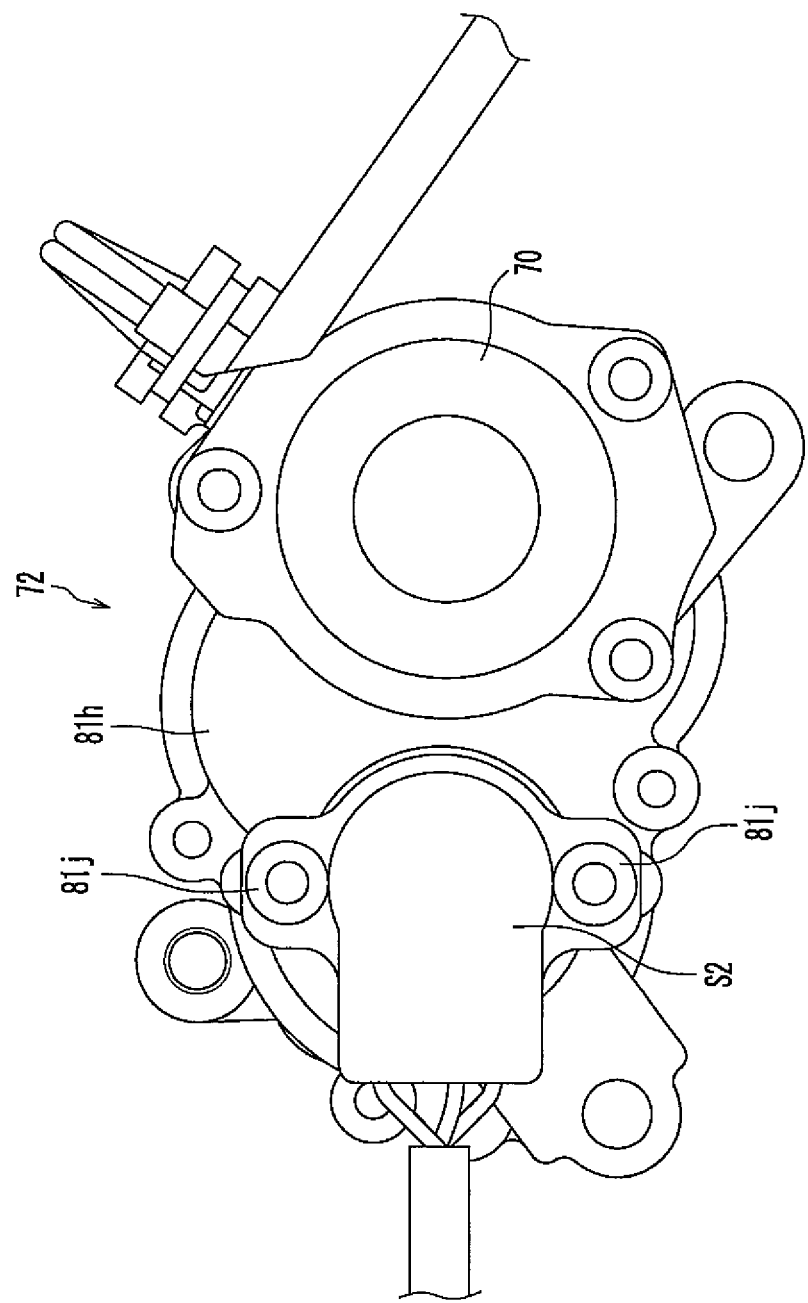
FIG. 7 is a side view of a clutch actuating unit according to the present invention.

As shown in FIG. 5, shift position detecting device S2 is disposed at one end of third shaft 81c which is the drive shaft (i.e. output shaft) of reduction mechanism 81. Shift position detecting device (angle sensor) S2 is disposed at the end of third shaft 81c and fastened to gear case 81h with attaching bolts 81j as shown in FIG. 7.

Figure 8:
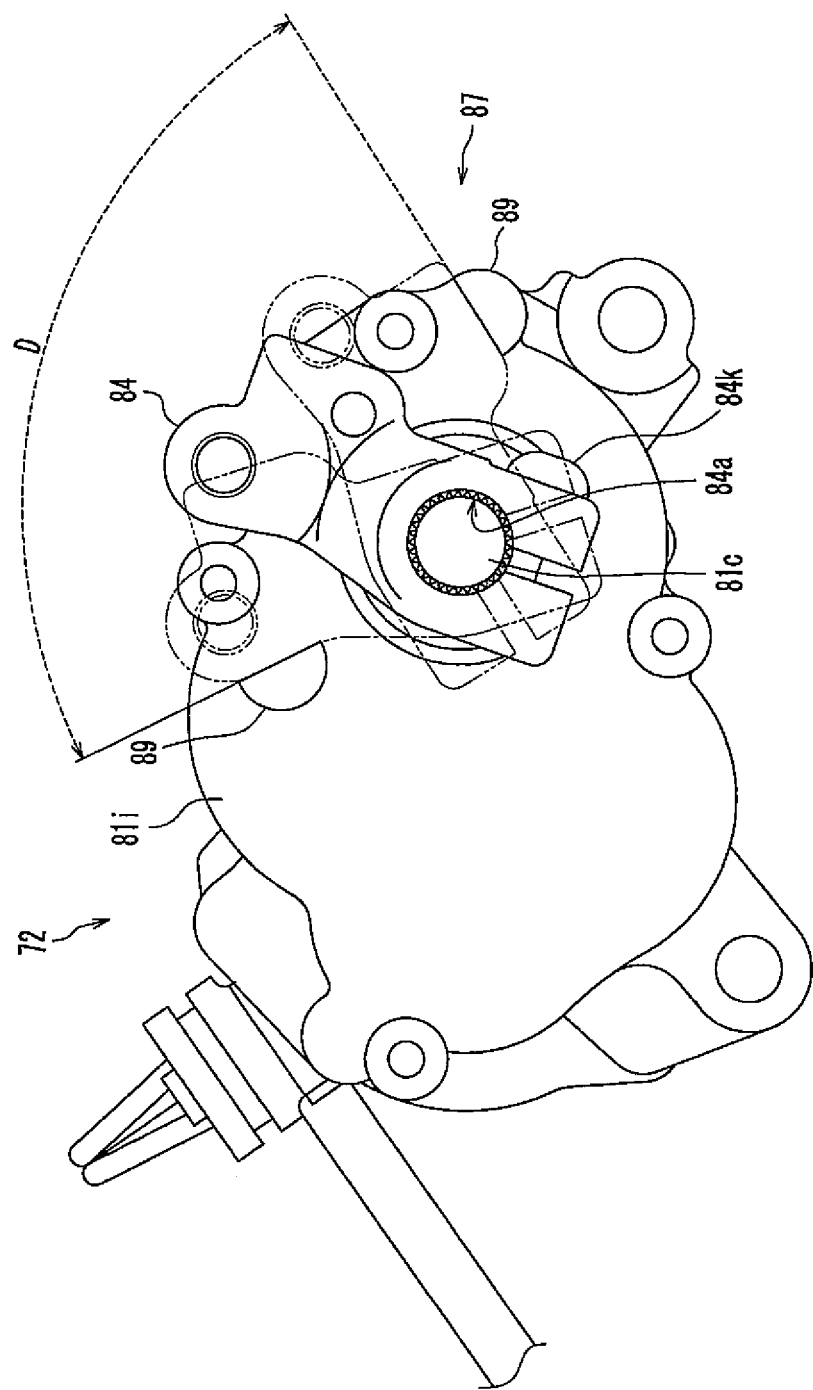
FIG. 8 is a side view of the clutch actuating unit.

As shown in FIG. 5, an actuating lever 84 is secured to the other end of third shaft 81c. Specifically, as shown in FIG. 8, actuating lever 84 is provided with an engaging bore 84a that engages with third reduction shaft 81c, and engaging bore 84a and third shaft 81c has a serration formed thereon. Actuating lever 84 is secured to third shaft 81c by meshing the serration of third shaft 81c with that of actuating lever 84 and fastening a bolt 81k. By thus securing, actuating lever 84 cannot relatively rotate relative to third shaft 81c. Consequently, upon rotation of third shaft 81c, which is the drive shaft (output shaft) of reduction mechanism 81, actuating lever 84 swings.

Stopper members 89 and 89, which restrict swing of actuating lever 84 within a predetermined angular range D, are attached to gear case 81i. Stopper members 89 and 89, together with actuating lever 84, form a stopper mechanism 87. Stopper mechanism 87 restricts swing of actuating lever 84 within a predetermined angular range D to restrict rotation of third shaft 81c to an angular position out of the sensing region of shift position detecting device (angle sensor) S2.

Figure 9:
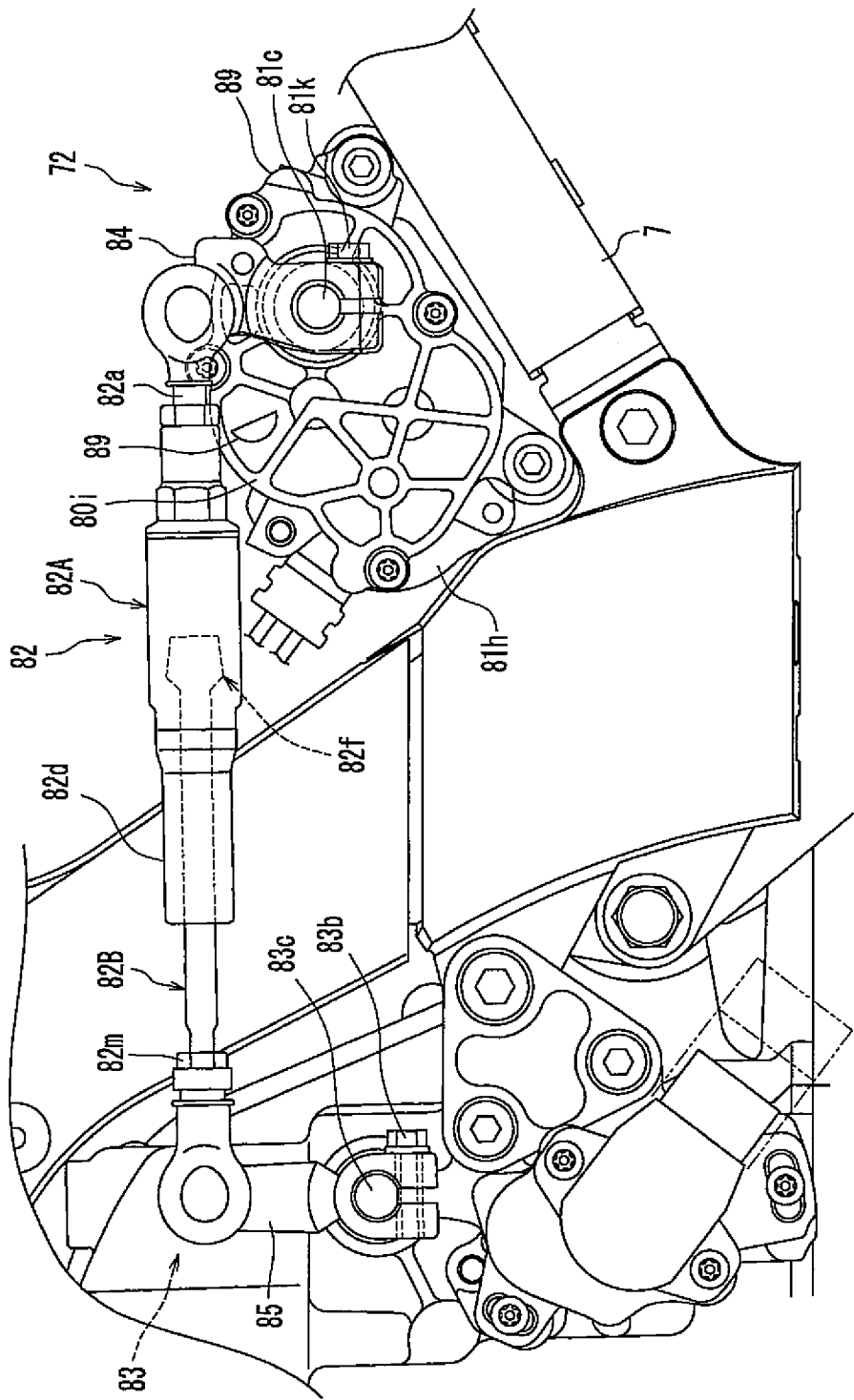
FIG. 9 is an enlarged side view of a shift rod and its vicinity according to the present invention.

As shown in FIGS. 4 and 9, a connecting portion 82a of shift rod 82 at the shift motor side is connected to actuating lever 84 via a bolt 82b. As shown in FIG. 4, connecting portion 82a at the shift motor side is supported by a bearing 82c and freely rotatable with respect to bolt 82d. Thus, swing of actuating lever 84 moves shift rod 82 in a longitudinal direction of the rod.

As shown in FIGS. 4 and 9, shift rod 82 includes connecting portion 82a at the shift motor side, a first rod body 82A, a second rod body 82B and a connecting portion 82m at the shift link mechanism side. A portion of first rod body 82A at shift link mechanism 83 side is formed of a tubular body 82d. A step 82e with a larger diameter than that of other parts is formed inside of tubular body 82d. On the other hand, second rod body 82B is formed with a larger diameter portion 82f having a diameter larger than that of other parts at the end of the shift motor. Second rod body 82B is inserted into tubular body 82d so that larger diameter portion 82f is housed within step 82e of first rod body 82A. Coil springs 86 are provided inside tubular body 82 and at both axial sides of larger diameter portion 82f to elastically support larger diameter portion 82f.

The end of first rod body 82A at the shift motor 70 side (on the right of FIG. 4) is screwed to a threaded portion 82g of connecting portion 82a at the shift motor side. The end of second rod body 82B at the shift link mechanism side (on the left of FIG. 4) is screwed to a threaded portion 82i of connecting portion 82m at the shift link mechanism side. Upon rotation of first rod body 82A or second rod body 82B, a screwing length of threaded portion 82g or threaded portion 82i is varied so that the length of shift rod 82 can be adjusted. Thus, the length of shift rod 82 may easily be adjusted merely by rotating first rod body 82A or second rod body 82B, so that the position of shift motor 70 can be selected more freely. The structure by which the length of shift rod 82 may be adjusted is not limited to that shown in FIG. 4 and alternative structures may be employed.

Connecting portion 82m of second rod body 82B at the shift link mechanism side is connected to an actuating lever 85 by a bolt 82n. Connecting portion 82m at the shift link side is supported by a bearing 82o and is freely rotatable with respect to bolt 82n. Thus, movement of shift rod 82 in the longitudinal direction thereof causes swing of actuating lever 85.

Actuating lever 85 is secured to a shift actuating shaft 83a of shift link mechanism 83. Specifically, an engaging bore that engages with shift actuating shaft 83a is provided in actuating lever 85. A serration is formed in each of the engaging bore and shift actuating levers 83a. Actuating lever 85 is secured to shift actuating shaft 83a by meshing the serration of actuating lever 85 with that of shift actuating shaft 83a and fastening a bolt 83b. By thus securing, actuating lever 85 cannot relatively rotate relative to shift actuating shaft 83a. Consequently, when actuating lever 85 swings, shift actuating shaft 83a rotates.

Shift link mechanism 83 is disposed within crankcase 32 and includes shift actuating shaft 83a. As described above, actuating lever 85 is fixed to end 83c of shift actuating shaft 83. A link lever 83e is attached to the other end 83d of shift actuating shaft 83a not to relatively rotate. A holder 83f is attached inward from link lever 83e of other end 83d of shift actuating shaft 83a, and a coil spring 83g is wound around the outer surface of holder 83f. A support shaft 83i is attached to one end 83h of link lever 83e. A pawl 83k is freely rotatably attached to support shaft 83i. With such a configuration, rotation of shift actuating shaft 83a swings link lever 83e. As a result, an engaging part 83m of pawl 83k pushes a pin at the end of shift cam 421 (see FIG. 3) to rotate shift cam 421. Coil spring 83g supports and biases pawl 83k to the neutral position thereof.

The configuration of gear selecting mechanism 43 and shift power transmission mechanism 80 have been described above. Automated shift control device 50 is now described.

<Automated Shift Control Device 50>

Figure 10:
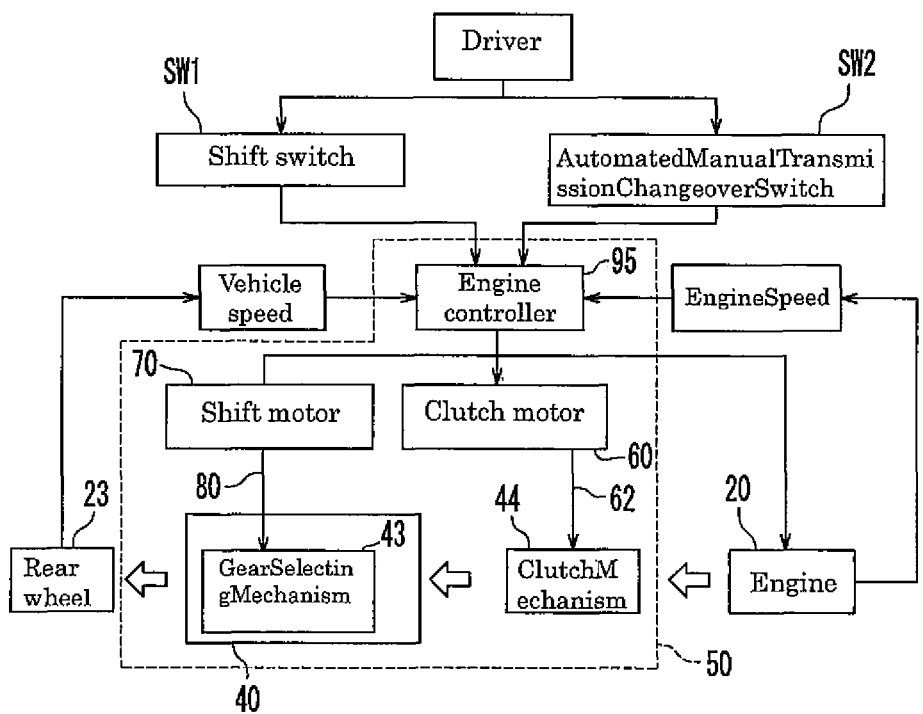
FIG. 10 is a system chart of an automated transmission control device according to the present invention.

As shown in FIG. 10, automated shift control device 50 actuates clutch mechanism 44 and automatically switches the speed change gears of transmission 40. Automated shift control device 50 includes an engine controller 95, clutch motor 60 for driving clutch mechanism 44, a clutch power transmission mechanism 62 (see FIG. 3) for transmitting power from clutch motor 60 to clutch mechanism 44, shift motor 70 for driving gear selecting mechanism 43 of transmission 40, shift power transmission mechanism 80 for transmitting power from shift motor 70 to gear selecting mechanism 43, and other components (various sensors) necessary for automated shift control (automated manual transmission).

<System of Automated Shift Control Device 50>

Figure 11:
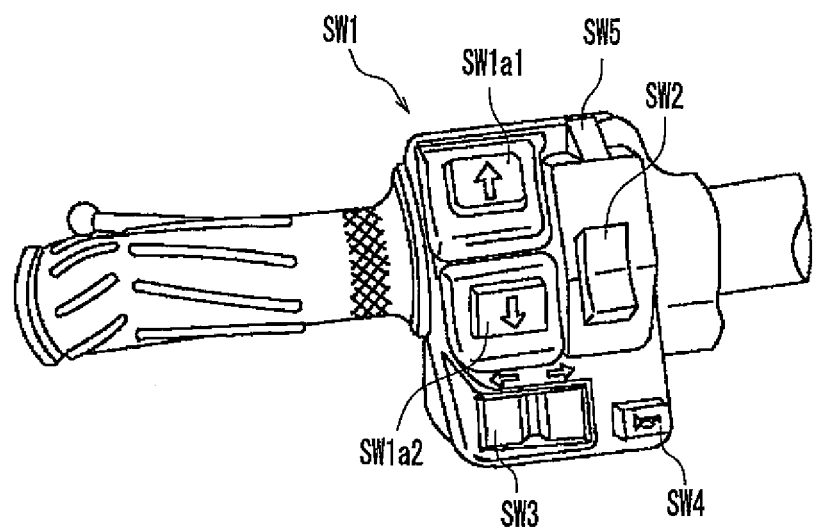
FIG. 11 is a perspective view of a switch portion on a handle grip according to the present invention.

The system of automated shift control device 50 is now described. As shown in FIG. 11, a steering handle 11 has a shift switch SW1 on the left grip. Shift switch SW1 includes a shift-up switch SW1a1 and a shift-down switch SW1a2, and changes the shift position of the speed change gear between a first to a highest (e.g., sixth) speed as appropriate by manual operation of a driver. A changeover switch SW2, an indicator switch SW3, a horn switch SW4, and a light switch SW5 are also provided on the left grip. Changeover switch SW2 switches the gear shifting operation between a semi-auto mode and a full-auto mode.

The operation of gear selecting mechanism 43 and clutch mechanism 44 during gear shifting by automated shift control device 50 is now described. As shown in FIG. 10, the switching of gear selecting mechanism 43 and clutch mechanism 44 is executed by automated shift control device 50. In motorcycle 1, various sensors in addition to shift position detecting device S2 of shift motor 70 are provided, such as a clutch position detecting device of clutch motor 60 and a speed sensor.

The switching of gear selecting mechanism 43 and clutch mechanism 44 starts when shift switch SW1 is operated by a driver. An engine controller 95 drives clutch motor 60 and shift motor 70 based on data detected by the various sensors and an instruction of shift switch SW1. Specifically, engine controller 95 automatically performs a series of shift operation of disconnection of clutch mechanism 44, switching of the speed change gear of transmission 40, and connection of clutch mechanism 44 according to a predetermined program stored in advance in engine controller 95 and by other arithmetic circuits. The gear shifting operation is now described in greater detail.

<Disconnection of Clutch Mechanism 44>

First, disconnection of clutch mechanism 44 is described. At first, engine controller 95 drives and rotates clutch motor 60 based on the instruction from shift switch SW1. Then, an output shaft 60g moves to the left in FIG. 3. As a result, a piston 60l of a cylinder 60k is pushed to the left in FIG. 3 so that oil present in an oil chamber 60n passes through an oil hose 60q into a space 467 surrounded by cylinder body 465 and piston 463. When oil is supplied to space 467, piston 463 moves to the right in FIG. 3. Oil chamber 60n communicates with a reserve tank 60t through a reserve hose 60s (see FIG. 2).

Rightward movement of piston 463 causes pressure plate 451 to be pushed in the rightward direction in FIG. 3 via push rod 461, ball 459, push rod 455 and deep-groove ball bearing 457. When the pressure becomes larger than the force with which springs 450 bias pressure plate 451 to the left in FIG. 3, pressure plate 451 moves to the right in FIG. 3. Thus, pressing member 451B of pressure plate 451 is separated from friction discs 445. As a result, contact between friction discs 445 and clutch plates 449 is released so that no frictional force to transmit torque is generated between friction discs 445 and clutch plates 449. In this way, clutch mechanism 44 is disconnected.

Upon disconnection of clutch mechanism 44, shifting of speed change gears of the transmission 40 is subsequently performed. The shifting operation of the speed change gears is described below.

<Shifting Operation of Speed Change Gears>

Upon disconnection of clutch mechanism 44, engine controller 95 drives and rotates shift motor 70 while keeping clutch mechanism 44 disconnected. As a result, gear 70d of motor shaft 70a rotates. As shown in FIG. 4, rotation of gear 70d causes first reduction gear 81e, first shaft 81a, gear 81s, second reduction gear 81f, second shaft 81b, gear 81t and third reduction gear 81g to be interlocked in a sequential order and rotate. As a result, third shaft 81c which is the drive (i.e., output) shaft of reduction mechanism 81 rotates.

As shown in FIG. 4, shift position detecting device S2 is attached to the end of third shaft 81c. Shift position detecting device S2 determines position information based on the rotation of third shaft 81c and sends the position information to engine controller 95. Engine controller 95 controls shift motor 70 based on the above-mentioned position information.

When third shaft 81c rotates, actuating lever 84 swings, and when actuating lever 84 swings, shift rod 82 moves in the longitudinal direction of the rod. When shift rod 82 moves, actuating lever 85 swings; when actuating lever 85 swings, shift actuating shaft 83a rotates. Then, when shift actuating shaft 83a rotates, link lever 83e swings, and shift cam 421 rotates by a predetermined angle via engaging part 83m of pawl 83k.

As shown in FIG. 3, rotation of shift cam 421 causes shift forks 422 to move along cam grooves 421a in the axial direction of the cam by a predetermined amount. This axial movement of shift forks 422 causes a pair of the speed change gear 49 and the speed change gear 420 to be fixed subsequently to main shaft 41 and to drive shaft 42. According to this operation, the pair of speed change gears to transmit driving power is selected and switched. Thus, rotational driving power transmitted to main shaft 41 is transmitted to drive shaft 42 in the predetermined transmission gear ratio.

Occasionally, transmission 40 may not operate because, for example, speed change gears 49 and 420 do not smoothly engage or disengage, so that shift power transmission mechanism 80 cannot transmit torque from shift motor 70 to transmission 40 even when shift motor 70 drives. In such cases, excessive torque may be generated in shift power transmission mechanism 80 and shift motor 70 may be overloaded.

However, automated shift control device 50 according to the present invention includes torque limiter 88. Therefore, overload of shift motor 70 is suppressed. Specifically, when the torque to be transmitted by shift power transmission mechanism 80 exceeds predetermined limit torque L, against the frictional force generated between third reduction gear 81g and third shaft 81c, third reduction gear 81g slips relative to third shaft 81c. In other words, third reduction gear 81g rotates relative to third shaft 81c. As a result, the torque applied to shift power transmission mechanism 80 is relieved and the load on shift motor 70 is suppressed.

Predetermined limit torque L is selected so as not to overload shift motor 70. According to this embodiment, limit torque L is set to the maximum torque transmitted by shift power transmission mechanism 80. However, limit torque L may be set as desired, and a value below the maximum torque may be set.

Figure 12:
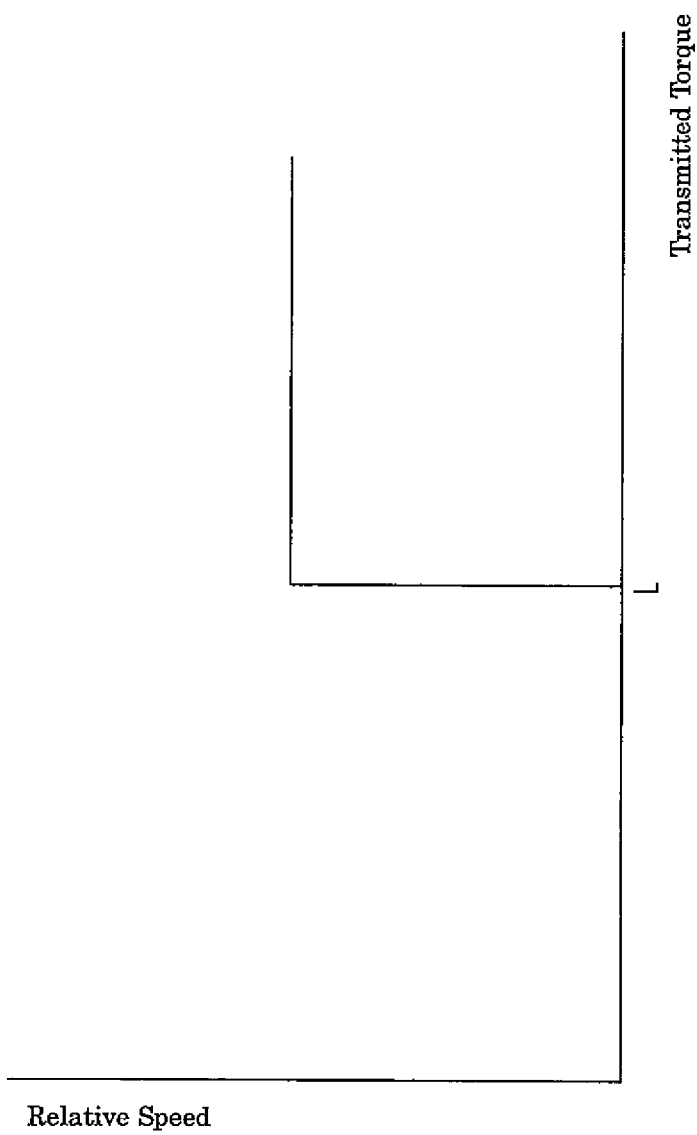
FIG. 12 is a correlation diagram of torque to be transmitted by the shift power transmission mechanism and relative speed of the third reduction gear and third shaft.

The manner in which third reduction gear 81g and third shaft 81c constituting torque limiter 88 slip is not particularly limited. The slip operation may be performed in a manner as shown in FIG. 12. FIG. 12 shows a correlation diagram of transmitted torque and slip speed, with the torque to be transmitted by shift power transmission mechanism 80 being on the abscissa and the relative speed between third reduction gear 81g and third shaft 81c being on the ordinate. As shown in FIG. 12, third reduction gear 81g and third shaft 81c do not relatively rotate until the torque to be transmitted by shift power transmission mechanism 80 reaches predetermined limit torque L. When the torque to be transmitted by shift power transmission mechanism 80 exceeds limit torque L, torque limiter 88 functions, causing relative rotation of third reduction gear 81g and third shaft 81c. As a result, the torque transmitted between third reduction gear 81g and third shaft 81c is kept not more than limit torque L. Thus, according to this embodiment, torque limiter 88 limits the torque transmitted by shift power transmission mechanism 80 to limit torque L or less. As a result, the torque transmitted by shift power transmission mechanism 80 will not exceed limit torque L.

The relationship between transmitted torque and slip speed is not limited to that shown in FIG. 12. In other words, the relative rotational speed between third reduction gear 81g and third shaft 81c is not limited to the one as shown in FIG. 12 where, after the torque to be transmitted exceeds limit torque L, the torque increases in a step-like manner. For example, the relative rotational speed may increase gradually after the torque to be transmitted exceeds limit torque L.

As described above, even when transmission 40 does not operate smoothly for some reason, torque limiter 88 limits the torque to be transmitted by shift power transmission mechanism 80 to limit torque L or less. This limits the load on shift motor 70 to suppress the overloaded condition of shift motor 70. This also limits the force exerted on speed change gears 49 and 420 to prevent the gear shifting operation from stopping due to excessive force on speed change gears 49 and 420. Accordingly, speed change gears 49 and 420 may eventually be disengaged or engaged to be fixed to main shaft 41 and drive shaft 42, thereby completing the gear shifting operation.

After the speed change gears are switched as described above, clutch mechanism 44 moves from a disconnected to a connected state. The connection operation of clutch mechanism 44 is described below <Connection Operation of Clutch Mechanism 44>

When switching of the speed change gears is completed, engine controller 95 drives and rotates clutch motor 60 in the reverse direction. As a result, output shaft 60g of clutch motor 60 gradually moves to the right in FIG. 3, and piston 60l moves to the right in FIG. 3. Movement of piston 60l causes oil to flow through oil hose 60q from space 467 surrounded by cylinder body 465 and piston 463 to oil chamber 60n.

The oil causes piston 463 biased by pressure plate 451 and springs 450 to gradually move to the left in FIG. 3. Pressure plate 451 also moves gradually to the left in FIG. 3. Pressing member 451B of pressure plate 451 comes in contact with friction disc 445 and pushes friction disc 445 to the left in FIG. 3. As a result, friction discs 445 and clutch plates 449 are sandwiched by pressing member 447B of clutch boss 447 and pressing member 451B of pressure plate 451 so that frictional force is generated between friction discs 445 and clutch plates 449. As pressure plate 451 further moves to the left in FIG. 3, the frictional force generated between friction discs 445 and clutch plates 449 increases due to the biasing force of springs 450. As a result, slip hardly occurs between friction discs 445 and clutch plates 449 and a sufficient frictional force to transmit torque from clutch housing 443 to clutch boss 447 is generated between friction discs 445 and clutch plates 449. In this way, clutch mechanism 44 is again connected.

As described above, automated shift control device 50 of the present embodiment includes torque limiter 88 provided within shift power transmission mechanism 80 and for transmitting power of shift motor 70 as torque and limiting the torque to be transmitted to predetermined limit torque L or less when the torque to be transmitted exceeds predetermined limit toque L. Third reduction gear 81g of torque limiter 88 co-rotates with third shaft 81c when the torque to be transmitted is not more than predetermined limit torque L, and rotates relative to third shaft 81c when the torque to be transmitted exceeds predetermined limit torque L. In other words, third reduction gear 81g and third shaft 81c rotate at the same speed when the torque to be transmitted is not more than predetermined limit torque L and, relatively rotate when torque to be transmitted exceeds predetermined limit torque L. Therefore, even when the torque to be transmitted by shift power transmission mechanism 80 temporarily exceeds predetermined limit torque L, relative rotation of third reduction gear 81g and third shaft 81c limits the torque to predetermined limit torque L or less. Therefore, overload of shift motor 70 is restricted. Moreover, automated shift control device 50 according to this embodiment restricts overload of shift motor 70 without restricting the torque of the shift motor itself or using a torque limiter formed of, for example, an elastic member of a small elastic modulus. Accordingly, the time from beginning to completion of the gear shifting operation can be shortened. Therefore, with automated shift control device 50 according to this embodiment, suppression of overload of shift motor 70 and reduction in time for gear shifting can be achieved at the same time.

In automated shift control device 50 according to this embodiment, third shaft 81c and third reduction gear 81g press-fitted to third shaft 81c form torque limiter 88. Third reduction gear 81g and third shaft 81c co-rotate when the torque transmitted from third reduction gear 81g to third shaft 81c is not more than predetermined limit torque L, and third reduction gear 81g rotates relative to third shaft 81c to relieve part of the torque to the outside of shift power transmission mechanism 80 when the torque to be transmitted from third reduction gear 81g to third shaft 81c exceeds predetermined limit torque L. In this way, according to the present invention, a simple configuration limits the torque transmitted by shift power transmission mechanism 80 to predetermined limit torque L or less even when the torque to be transmitted exceeds predetermined limit torque L, and therefore limits overload of shift motor 70.

With automated shift control device 50 of the present invention, third reduction gear 81g and third shaft 81c are arranged not to relatively rotate when the torque to be transmitted is not more than predetermined limit torque L. Accordingly, when third reduction gear 81g rotates relative to third shaft 81c so that the transmitted torque is reduced to predetermined torque L or less, third reduction gear 81g and third shaft 81c revert to the original state and do not relatively rotate. Thus, torque limiter 88 of automated shift control device 50 according to the present invention can be used multiple times without replacement to limit overload of shift motor 70.

In automated shift control device 50 of the present invention, torque limiter 88 is formed of third reduction gear 81g, which is one of reduction gears 81e-81g, and third shaft 81c, which is one of shafts 81a-81c, both forming reduction mechanism 81. In other words, in automated shift control device 50 of the present invention, torque limiter 88 is formed of a part of reduction mechanism 81. Therefore, torque limiter 88 is simply formed and the torque limiting function is added to an existing reduction mechanism 81 without separately providing torque limiter 88. Thus, addition of the torque limiting function does not increase the number of components or size of the device.

In this embodiment, predetermined limit torque L is adjusted according to the press-fit interference (i.e., diameter of the shaft/diameter of the press-fitted gear). Therefore, the smaller the inner diameter of the press-fitted gear is, the more the adjustment of limit torque L may be influenced by deviation between actual and target interferences (i.e., tolerance of the press-fit interference).

Thus, in automated shift control device 50 of the present invention, torque limiter 88 is formed of third reduction gear 81g and third shaft 81c, both of which are most downstream of reduction gears 81e-81g and shafts 81a-81c forming reduction mechanism 81. Third reduction gear 81g is located most downstream and has the largest diameter among the three reduction gears 81e-81g, so that the influence of the tolerance of the press-fit interference on the adjustment of limit torque L is reduced. In this way, automated shift control device 50 of the present invention facilitates adjustment of limit torque L and production of torque limiter 88.

In automated shift control device 50 of the present invention, the surface of press-fitted portion 81p of third shaft 81c to which third reduction gear 81g is press-fitted is corbett-treated (i.e., sulphurized at a low temperature) to form a sulphurized layer having self-lubrication properties on the surface of press-fitted portion 81p. Thus, excessive torque is suitably reduced. Therefore, a configuration to limit overload of shift motor 70 is easily provided. Since the torque limiting function is provided by the corbett-treatment (i.e., sulphurizing at a low temperature) of the existing component without adding a member having self-lubrication properties, torque limiter 88 is easily formed.

Automated shift control device 50 of the present invention also includes stopper mechanism 87. Therefore, it is possible to restrict rotation of third shaft 81c such that third shaft 81c at one end of which shift position detecting device (angle sensor) S2 is attached does not rotate to an angular position out of the sensing region of shift position detecting device (angle sensor) S2.

While the rotating part of stopper mechanism 87 is formed of actuating lever 84 and the stationary part of stopper mechanism 87 is formed of stopper members 89 and 89 in this embodiment, it is contemplated that the rotating part may be provided on third reduction gear 81g and the stopper members as a stationary part may be provided inside gear case 81h. However, in this embodiment, torque limiter 88 is formed of third reduction gear 81g and third shaft 81c, and third reduction gear 81g rotates relative to third shaft 81c when the transmitted torque exceeds predetermined limit torque L. Thus, since the angular position between shift position detecting device (angle sensor) S2 and the rotating part is shifted, the function as the stopper cannot be obtained.

However, in automated shift control device 50 according to this embodiment, the rotating part of stopper mechanism 87 is formed of actuating lever 84, and is attached to third shaft 81c. Thus, the angular position between shift position detecting device (angle sensor) S2 and actuating lever 84 as the rotating part does not shift even when third reduction gear 81g rotates relative to third shaft 81c upon operation of torque limiter 88. Accordingly, it is possible to form torque limiter 88 from third reduction gear 81g and third shaft 81c and demonstrate the function of stopper mechanism 87.

Moreover, according to the invention, since automated shift control device 50 is provided, a straddle-type vehicle can be provided in which the time from beginning to completion of the gear shifting operation is shortened while overload of shift motor 70 is suppressed.

In this embodiment, torque limiter 88 is formed of third reduction gear 81g and third shaft 81c which are located most downstream among reduction gears 81e-81g and shafts 81a-81c of reduction mechanism 81. However, the torque limiter according to the invention is not limited to this embodiment. Torque limiter 88 may be formed of second reduction gear 81f and second shaft 81b, or may be formed of first reduction gear 81e and first shaft 81a. Alternatively, torque limiter 88 may be formed of actuating lever 84 and third shaft 81c. Specifically, actuating lever 84 may be press-fitted to third shaft 81c such that actuating lever 84 and third shaft 81c co-rotate when the torque is not more than predetermined limit L, and relatively rotate when the torque exceeds predetermined limit torque L. Alternatively, torque limiter 88 may be formed of actuating lever 85 and shift actuating shaft 83a. Specifically, actuating lever 85 may be press-fitted to shift actuating shaft 83a such that actuating lever 85 and shift actuating shaft 83a co-rotate when the torque is not more than predetermined limit L, and actuating lever 85 and shift actuating shaft 83a relatively rotate when the torque exceeds predetermined limit torque L.

Moreover, torque limiter 88 according to this embodiment is not limited to one in which torque is transmitted due to frictional force generated between the first rotating member at the input side (i.e., third reduction gear 81g) and the second rotating member at the output side (i.e., third shaft 81c), and in which torque is relieved when exceeding predetermined limit torque L by slipping the first rotating member relative to the second rotating member. For example, the torque limiter may be one in which the first rotating member at the input side and the second rotating member at the output side engage with each other to transmit torque, the first rotating member and the second rotating member temporarily disengage to relatively rotate when the torque to be transmitted exceeds predetermined limit torque L, and again engage with each other when having relatively rotate by the predetermined angle. An example of such a torque limiter is as follows.

Figure 13:
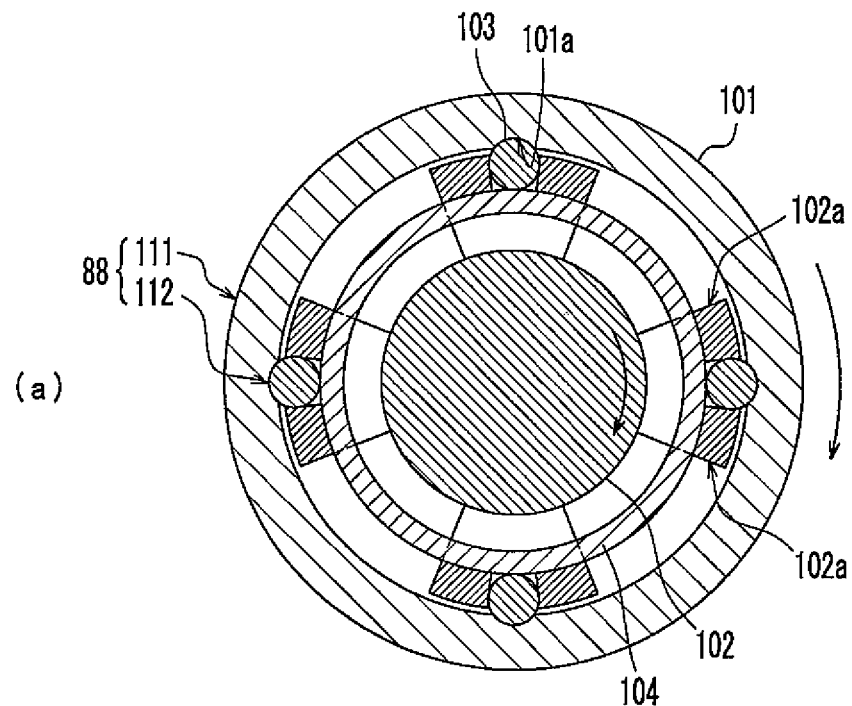
FIGS. 13(*a*) and 13(*b*) are diagrams showing operation of a torque limiter according to a variation of the present invention.
Figure 13:
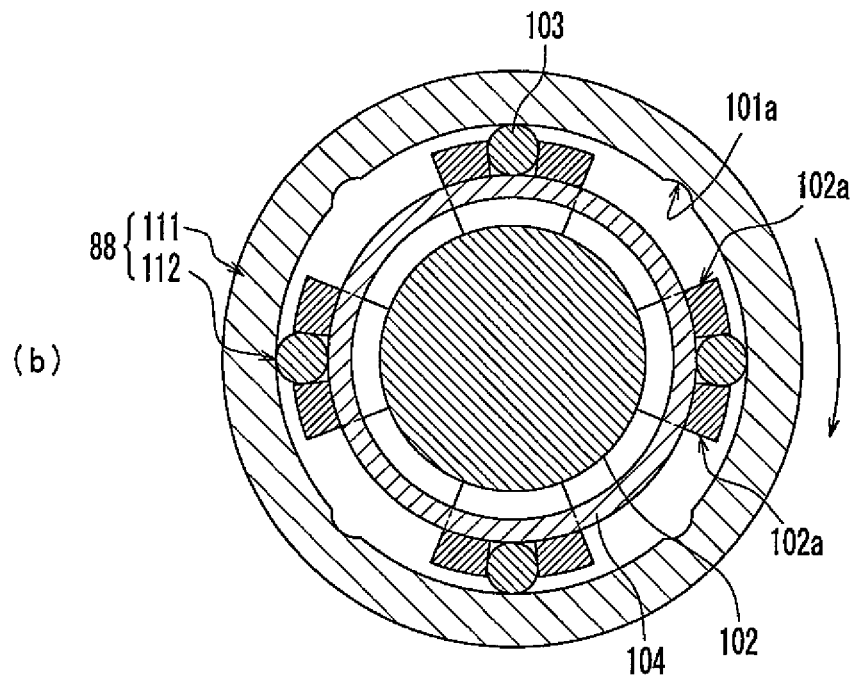

As shown in FIG. 13(a), a torque limiter 88 includes a rotating body 101, a rotating body 102, engaging members 103 and a coil spring 104. Rotating body 101 is provided with engaging holes 101a for engaging with engaging members 103. Rotating body 102 is provided with restricting members 102a that restrict movement of engaging members 103 in a circumferential direction of rotating body 102. Coil spring 104 is provided between rotating body 101 and rotating body 102 and presses engaging members 103 against rotating body 101. Rotating body 101 constitutes a first rotating member 111, and rotating body 102, engaging members 103 and coil spring 104 form a second rotating member 112.

With such a configuration, in the state that engaging member 103 engages with engaging holes 101a of rotating body 101, first rotating member 111 and second rotating member 112 are engaged with each other via engaging members 103 so that first rotating member 111 and second rotating member 112 cannot relatively rotate. When rotating body 101 rotates in this engaged state, torque from rotating body 101 is transmitted to rotating body 102 via engaging members 103, and rotating body 102 rotates.

On the other hand, when torque from rotating body 101 to rotating body 102 exceeds predetermined limit torque L, wall surfaces of engaging holes 101a of rotating body 101 press engaging members 103 to rotating body 102 against a biasing force from coil spring 104. As a result, engaging members 103 disengage from engaging holes 101a so that the engagement between rotating body 101 and engaging member 103 is released. Thus, the engaged state between first rotating member 111 and second rotating member 112 is released. As a result, first rotating member 111 rotates relative to second rotating member 112 (see FIG. 13(b)).

When rotating body 101 of first rotating member 111 rotates by a predetermined, angle (approximately 90 degrees in FIG. 13), each engaging member 103 fits into another engaging hole 101a. Thus, first rotating member 111 and second rotating member 112 are again engaged, disabling relative rotation.

As described above, torque limiter 88 may be formed of first rotating member 111 and second rotating member 112, which are engaged with each other and co-rotate when the transmitted torque is not more than predetermined limit torque L, disengaged and relatively rotate when the transmitted torque exceeds predetermined limit torque L, and are again engaged and co-rotate when having rotated by the predetermined angle. Also according to this embodiment, when the torque to be transmitted by shift power transmission mechanism 80 temporarily exceeds predetermined limit torque L for some reason, engagement of first rotating member 111 with second rotating member 112 is released to allow relative rotation of both members so that the torque is limited to predetermined limit torque L or less. Therefore, overload of shift motor 70 is restricted. Moreover, since first rotating member 111 and second rotating member 112 are again engaged when relatively rotating by the predetermined angle, overload of shift motor 70 can be limited multiple times.

Torque limiter 88 may have another structure. For example, torque limiter 88 may have a structure as disclosed in Japanese Unexamined Patent Publication No. 10-252773, Japanese Unexamined Patent Publication No. 2006-38039 or Japanese Unexamined Patent Publication No. 2006-170248.

As described above, the present invention is useful for an automated shift control device that automatically performs a gear shifting operation of a transmission, and for a straddle-type vehicle provided with the automated shift control device.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. An automated shift control device, comprising:
a transmission comprising a plurality of pairs of speed change gears having different transmission gear ratios, and a gear selecting mechanism for selecting a pair of speed change gears from among the plurality of pairs to transmit power;
a shift actuator for generating power to drive the gear selecting mechanism;
a shift power transmission mechanism for transmitting the power from the shift actuator to the gear selecting mechanism,
wherein the shift power transmission mechanism includes a reduction mechanism having a plurality of reduction gears, that each have a radius, press-fitted to a plurality of shafts, a first rotating member being a most downstream reduction gear of the plurality of reduction gears, the radius of the most downstream reduction gear being larger than any other of the radiuses of the plurality of reduction gears, and a second rotating member being a shaft of the plurality of shafts to which the most downstream reduction gear that is the first rotating member is press-fitted so that the first rotating member contacts the second rotating member,
the shift power transmission mechanism including a torque limiter forming a part of the shift power transmission mechanism and having the first rotating member to which the power from the shift actuator is transmitted and the second rotating member to which the power transmitted to the first rotating member is transmitted from the first rotating member as torque, wherein
when the torque to be transmitted to the second rotating member equals or is less than a predetermined limit torque, the first rotating member co-rotates with the second rotating member to transmit the power from the shift actuator to the second rotating member as the torque, and
when the torque to be transmitted to the second rotating member exceeds the predetermined limit torque, the first rotating member rotates relative to the second rotating member by having the first rotating member slip relative to the second rotating member to limit the transmitted torque to the predetermined limit torque;
an angle sensor, for detecting an angular position, attached to the second rotating member; and
a stopper mechanism for restricting rotation of the second rotating member to avoid rotation of the second rotating member to the angular position out of a detection area of the angle sensor, wherein the stopper mechanism has a rotating part that is attached to and co-rotates with the second rotating member, and a stationary part that is formed separately from the rotating part and abuts the rotating part to restrict rotation of the second rotating member within a predetermined angular range.

2. The automated shift control device according to claim 1, wherein a layer having self-lubrication properties is formed on a surface of a portion of the second rotating member to which the first rotating member is press-fitted.

3. The automated shift control device according to claim 1, wherein the surface of the portion of the second rotating member to which the first rotating member is press-fitted is subjected to sulphurizing at a low temperature.

4. A straddle-type vehicle comprising an automated shift control device according to claim 1.

* * * * *